United States Patent [19]
Wayne

[11] Patent Number: 5,152,637
[45] Date of Patent: Oct. 6, 1992

[54] DEVICE FOR ELIMINATING MARINE LIFE FROM WATER INTAKE COVERS

[76] Inventor: Mark Wayne, 29436 Briarbank Ct., Southfield, Mich. 48034

[21] Appl. No.: 702,423

[22] Filed: May 20, 1991

[51] Int. Cl.⁵ .............................................. E02D 5/60
[52] U.S. Cl. ........................................ 405/127; 43/98; 119/4; 405/211
[58] Field of Search ................. 405/127, 211, 216, 52; 43/98, 99; 119/2–4; 52/101

[56] References Cited

U.S. PATENT DOCUMENTS

| | | | |
|---|---|---|---|
| 794,573 | 7/1905 | Ward | 43/98 |
| 855,588 | 6/1907 | Prudden | 43/98 |
| 1,292,246 | 1/1919 | Burkey | 43/98 X |
| 1,591,421 | 7/1926 | Gilbert | 405/127 |
| 2,271,569 | 2/1942 | Palos | 43/98 |
| 3,309,167 | 3/1967 | Galler | 405/211 X |
| 4,038,639 | 7/1977 | Kuebler | 52/101 X |

FOREIGN PATENT DOCUMENTS

| | | | |
|---|---|---|---|
| 282653 | 8/1952 | Switzerland | 43/98 |
| 1351556 | 11/1987 | U.S.S.R. | 52/101 |
| 1510810 | 9/1989 | U.S.S.R. | 43/98 |

Primary Examiner—Dennis L. Taylor
Attorney, Agent, or Firm—Gifford, Groh, Sprinkle, Patmore & Anderson

[57] ABSTRACT

A cover for eliminating marine life from the intake of a water intake positioned beneath the surface of a body of water. The cover is placeable over a water intake and is provided with a plurality of apertures formed therethrough which permit water to flow into the water intake. An electrical wire is embedded in a spiral or serpentine fashion within the cover. An insulated cable connects to the embedded wire and provides a radio frequency signal from an external source of power. The wire radiates radio frequency energy over the surface of the cover so that sea mussels and other marine life which have accumulated on the cover are repelled or killed. In a different configuration, electrical heating elements are connected to the wire and generate sufficient heat to drive off or kill the marine life. In a further embodiment, a sonic generator is attached to the cover and generates sonic waves which achieve the same result.

7 Claims, 2 Drawing Sheets

DEVICE FOR ELIMINATING MARINE LIFE FROM WATER INTAKE COVERS

BACKGROUND OF THE INVENTION

I. Field of the Invention

The present invention relates to a device for eliminating marine life growth on water intake covers.

II. Description of the Prior Art

Various chemical methods are known in the art for controlling and/or removing marine organisms that exist underwater. Examples of such methods are disclosed in U.S. Pat. No. 3,279,984, issued to Ballard et al; U.S. Pat. No. 3,787,217, issued to Nitta et al; U.S. Pat. No. 4,872,999, issued to Schild et al; and U.S. Pat. No. 4,214,909 issued to Mawatari et al.

Also known in the art is a method of eliminating mussels and other small underwater creatures. U.S. Pat. No. 4,328,638, issued to Smithson, discloses a method of eliminating mussels and other underwater creatures by introducing chemicals which deplete the dissolved oxygen in the underwater zone around the mussels, thus depriving it of its means of survival.

While useful, none of the prior art discloses a method or a device for preventing marine life, and more particularly mussels, from adhering to the screens or covers of water intake lines. The prior art further does not disclose a device for eliminating marine life growth on water intakes which is effective over indefinite periods of time.

SUMMARY OF THE PRESENT INVENTION

The present invention provides a cover for eliminating marine life from water intakes which overcomes the above-mentioned disadvantages of the prior art devices.

In brief, the device of the present invention comprises a cover placeable over the open end of the water intake and provides a number of apertures formed therethrough to permit water to flow past the cover and into the water intake. An electrical wire is embedded in the cover in a spiral, serpentine or any other fashion so as to surround the apertures. An insulated cable connects the electrical wire to an external source of electrical energy which delivers a high frequency signal to the electrical wire. This high frequency signal is radiated from the wire embedded in the surface of the intake cover. The high frequency electromagnetic energy thus generated repels and or destroys the mussels and other marine life attached to the intake cover. The elimination of the mussels and other marine life from the cover presents restriction of the water intake flow. Alternately, electrical heater elements may be placed in series along the wire to generate heat sufficient to repel or destroy the mussels attached to the covers.

In an alternate embodiment, a sonic generator is connected to the cover in a fashion similar to the embedded wire and produces ultra sonic waves. The ultra sonic waves propagate over the surface of the cover and eliminate the mussels and marine life from the surface of the cover much in the same fashion as the propagation of the high frequency electrical energy discussed above.

BRIEF DESCRIPTION OF THE DRAWING

A better understanding of the present invention will be had upon reference to the following detailed description, when read in conjunction with the accompanying drawing, wherein like reference characters refer to like parts through the several views and in which.

DETAILED DESCRIPTION OF A PREFERRED EMBODIMENT OF THE PRESENT INVENTION

Figure 1:
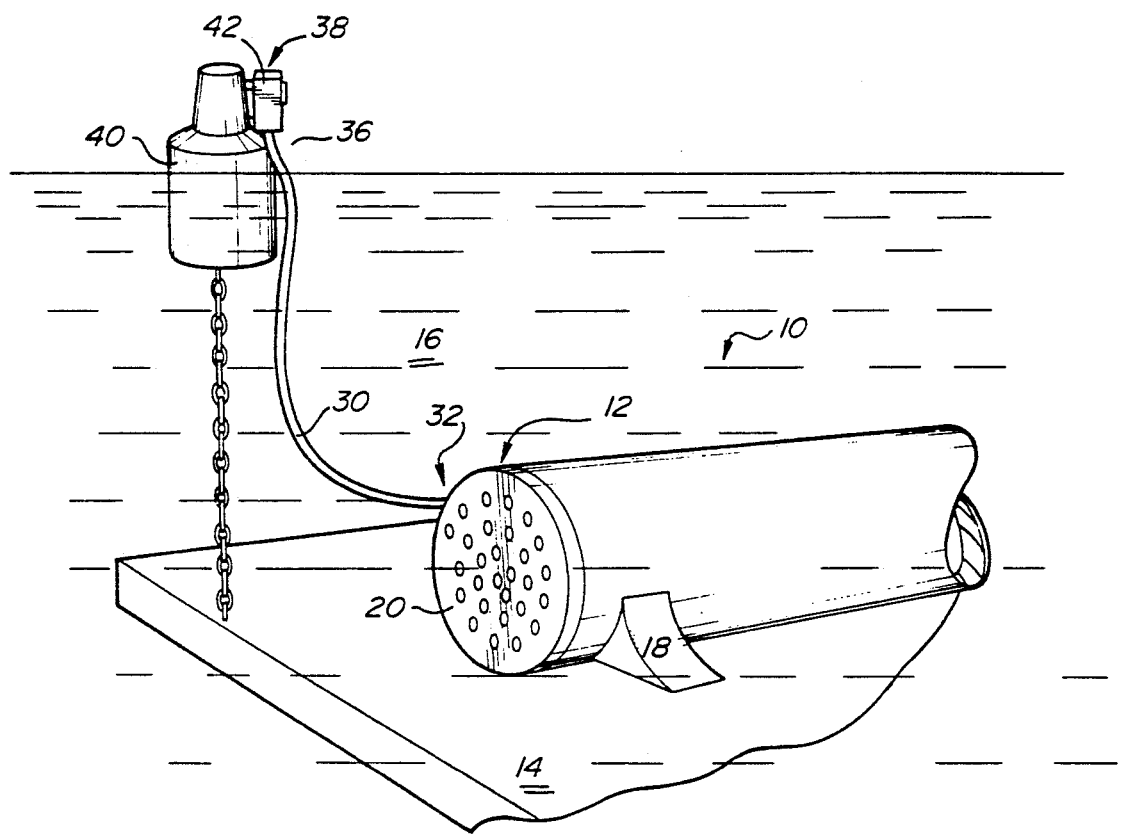
FIG. 1 is a perspective drawing of a preferred embodiment of the present invention.

With reference first to FIG. 1, a preferred embodiment of a device 10 for eliminating marine life from a water intake cover is shown and comprises a water intake 12 positioned beneath the surface of the body of water. The water intake 12 has an open end through which a volume of water 16 is drawn from the underwater surroundings. The water intake 12 is securably supported to the floorbed 14 of the body of water 16 by brackets 18 or other support means known in the art.

A cover 20 is provided over the open end of the water intake 12 and conforms in shape to that of the open end of the water intake 12. A plurality of apertures 22 are formed through the cover 20 through which the water 16 is permitted to flow when drawing in by the water intake 12. The cover 20 can be designed in any shape but, preferably, is designed to accommodate the shape of the open end of the water intake 12.

Figures 2, 3:
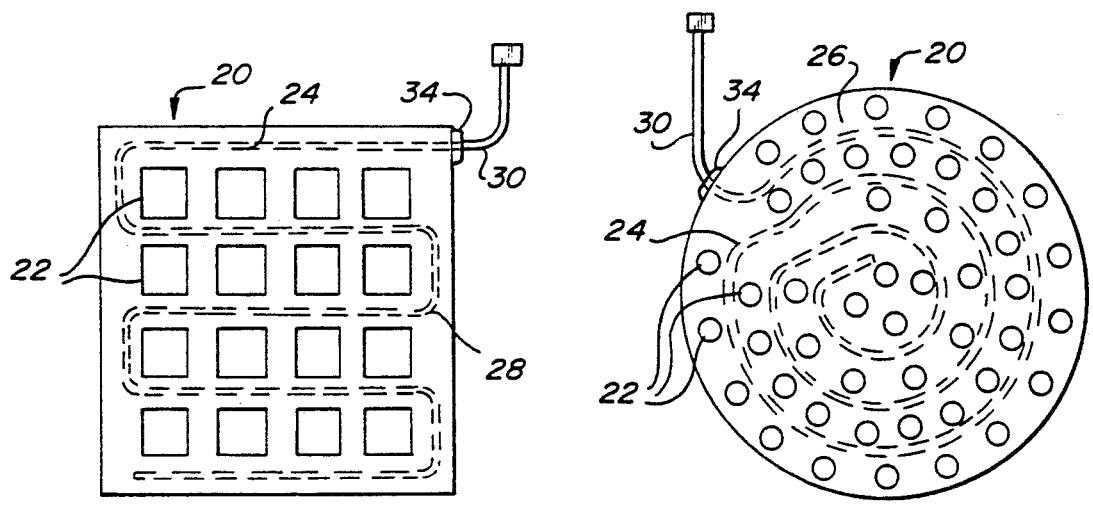
FIG. 2 is a sectional view displaying the cover of the present invention.
FIG. 3 is a view of an alternative cover design of the present invention.

Referring to FIGS. 2 and 3, an electrical wire 24 is embedded with in the cover 20. The electrical wire 24 may be positioned in a spiral 26, serpentine 28, or any other arrangement within the cover 20 so as to communicate with the maximum surface area of the cover 20. An insulated cable 30 connects at a first end 32 to a trailing end 34 of the electrical wire 24. The trailing end 34 of the electrical wire 24 extending outwardly from the cover 20 is likewise insulated. A second end 36 of the insulated cable 30 connects to a waterproof source of electrical energy 38. The source of electrical energy 38 may be positioned above water 16 to prevent water corrosion or other problems. A marker buoy 40 with an attached battery pack 42 may be utilized as the required electrical energy. Alternately, the source of electrical energy may be a direct AC/DC supply. In the embodiment of FIG. 1, the source of electrical energy is an oscillator generating a high frequency signal which is communicated through the coaxial cable 30 to the wire 24 embedded in the cover 20. The wire 24 acts as an antenna which radiates high frequency energy from the surface area of the cover 20 in response to the high frequency signal. Sea mussels and other marine life adhering to the surface of the cover 20 are exposed to the radio frequency energy and, in response thereto, are repelled or otherwise disengaged from the surface of the cover 20.

Figure 4:
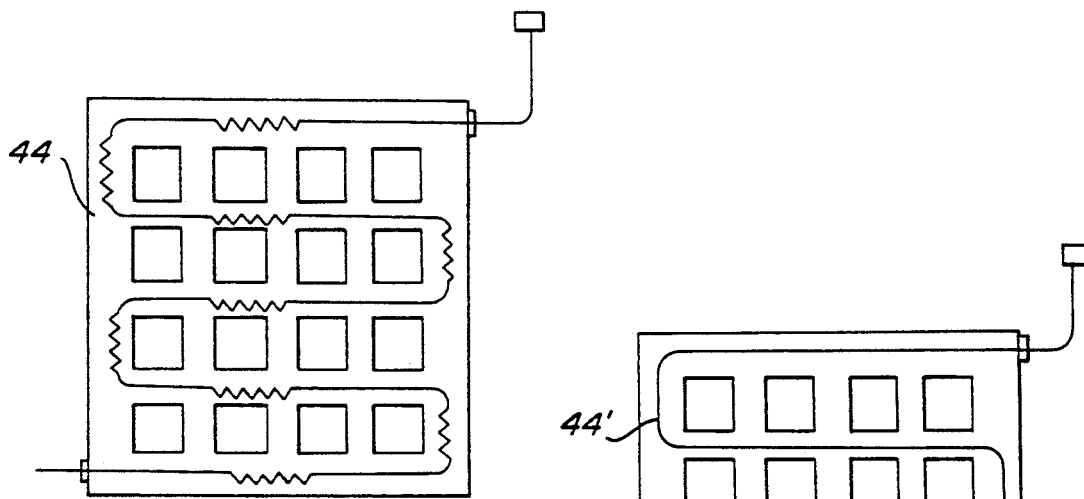
FIG. 4 is a sectional view displaying the electrical heating embodiment of the present invention.
Figure 5:
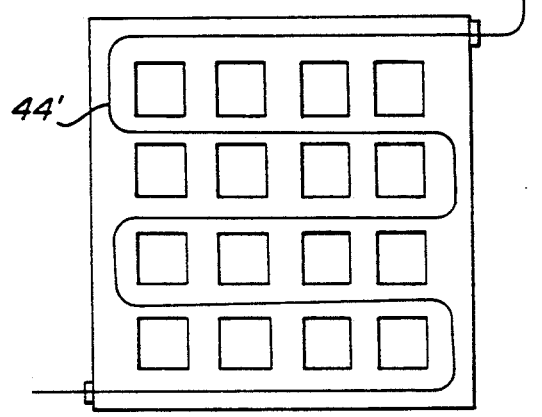
FIG. 5 is an alternate configuration of the embodiment shown in FIG. 4.

In an alternative configuration, a series of electrical heater elements 44 (see FIG. 4) are embedded in the cover 20 and are connected to each other by means of the wire 24 within the cover 20. As is well known in the art, the wire 24 may be a resistive heating wire, such as nichrome (see FIG. 5), and the wire itself may constitute a heating element 44'. An electrical current, either AC or DC, may be applied to the heating elements 44, 44' resulting in heat energy being generated which heats the cover 20 to a predetermined temperature. The heated cover 20 discourages any marine life from adhering to the surface of the cover 20. Optimally, the heating elements 44, 44' heat the cover 20 to a temperature of 120° F. which is sufficient to destroy the mussels.

Figure 6:
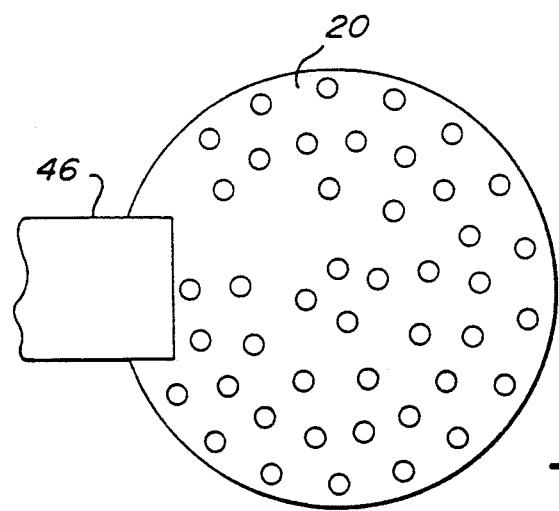
FIG. 6 is a sectional view displaying the ultra sonic embodiment of the present invention.

In a different embodiment, as shown in FIG. 6, a sonic generator 46 is connected to the edge of the cover 20. The sonic generator 46 is powered from the source of electrical energy 38 through the cable 30 and creates sonic vibrations of the cover 20. In this embodiment, the cover 20 is positioned about the intake 12 in such a manner so as to permit radial oscillations which accompany the sonic vibrations. The sonic vibration of the cover 20 has the effect of discouraging the marine life from collecting on its surface thus freeing the intake flow from an unwanted collection of mussels and marine life.

Figure 7:
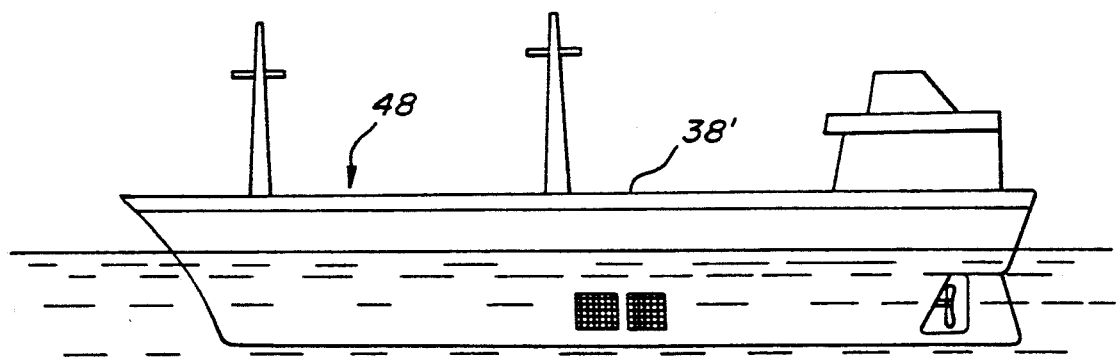
FIG. 7 is an alternative application of the present invention.

The device of the present invention may be mounted over the exterior cover of a water intake line as discussed above or, as shown in FIG. 7, mounted over a ballast intake 12' of a sea-going vessel 48. In this latter application, an external above-water source of electrical energy 38' is contained within the vessel.

Having described my invention, many modifications thereto will become apparent to those skilled in the art to which it pertains without deviation from the spirit of the invention as defined by the scope of the appended claims.

I claim:

1. A device for eliminating marine life from a water intake positioned beneath the surface of a body of water, comprising:
    a cover placeable over said water intake;
    a plurality of apertures formed through said cover, said apertures permitting water to flow through said cover into said water intake; and
    means for generating high frequency signals on and about said cover to eliminate the accumulation of marine life thereon.

2. The device as described in claim 1, said energy conducting means comprises:
    a length of wire embedded in said cover; and
    means for providing a radio frequency signal to said length of wire.

3. The device as described in claim 2, wherein said means for providing a high frequency signal is an electrical oscillator.

4. The device as described in claim 1, wherein said energy conducting means comprises a sonic generator delivering ultra sonic waves to said cover.

5. The invention as described in claim 2, further comprising an insulated cable extended underwater to connect to said length of wire embedded in said cover to said means for providing a high frequency signal.

6. The invention as described in claim 1, said water intake is mounted to the floorbed of said body of water.

7. The invention as described in claim 1, said water intake comprising a ballast intake of a sea-going vessel.

* * * * *